United States Patent [19]

Koyama

[11] Patent Number: 5,391,827
[45] Date of Patent: Feb. 21, 1995

[54] ELECTRONIC MUSICAL INSTRUMENT HAVING A MUSICAL TONE PARAMETER DISPLAY

[75] Inventor: Masahiro Koyama, Hamamatsu, Japan

[73] Assignee: Yamaha Corporation, Japan

[21] Appl. No.: 988,182

[22] Filed: Dec. 9, 1992

[30] Foreign Application Priority Data

Dec. 17, 1991 [JP] Japan .................. 3-333552

[51] Int. Cl.⁶ .................. G09B 15/04; G10H 1/00
[52] U.S. Cl. .................. 84/600; 84/477 R
[58] Field of Search .................. 84/600–602, 84/477 R, 478

[56] References Cited

U.S. PATENT DOCUMENTS

| | | | |
|---|---|---|---|
| 4,627,324 | 12/1986 | Zwosta | 84/477 R X |
| 4,833,962 | 5/1989 | Mazzola et al. | 84/478 X |
| 5,005,459 | 4/1991 | Adachi et al. | 84/478 X |

FOREIGN PATENT DOCUMENTS

| | | |
|---|---|---|
| 56-52800 | 5/1981 | Japan . |
| 3-121500 | 5/1991 | Japan . |

*Primary Examiner*—Stanley J. Witkowski
*Attorney, Agent, or Firm*—Graham & James

[57] ABSTRACT

An electronic musical instrument having a musical tone parameter display function includes a musical tone information designation device for designating a musical tone pitch or other parameter of a musical tone to be edit, a memory storing a basic formant display pattern shape for generating a musical tone wave, and a pattern shape change device for changing the basic formant display pattern shape according to the designated musical tone information. The changed formant pattern is displayed on a display graphically to allow a player to easily edit a tone color.

10 Claims, 8 Drawing Sheets

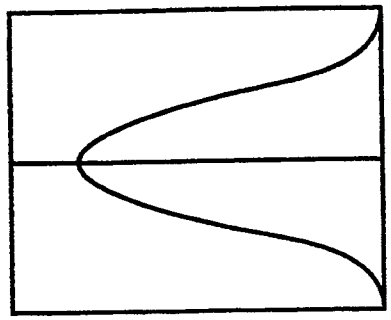
FIG. 6(C) (FBAND=200) (FLEVEL=80)
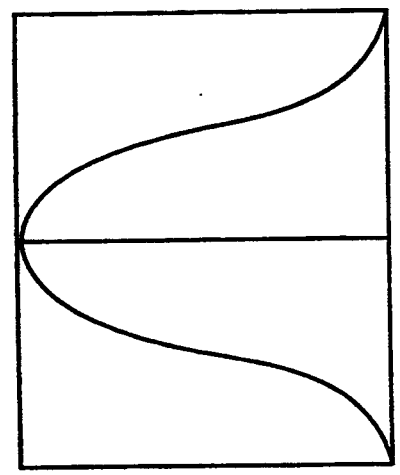
FIG. 6(B) (FBAND=300) (FLEVEL=100)
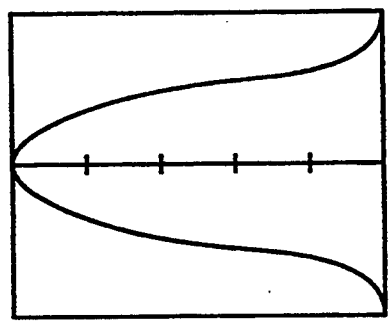
FIG. 6(A) (FBAND=200) (FLEVEL=100)
FORMANT DISPLAY BASIC PATTERN
CENTER

ELECTRONIC MUSICAL INSTRUMENT HAVING A MUSICAL TONE PARAMETER DISPLAY

BACKGROUND OF THE INVENTION

1. Field of the Invention

The present invention relates to an electronic musical instrument having a function of electronically synthesizing a musical tone. Particularly, the present invention relates to an electronic musical instrument which is capable of graphically displaying characteristics of the synthesized musical tone, such as a frequency distribution.

2. Prior Art

Generally, typical electronic musical instruments have been so arranged that musical tones are generated on the basis of any musical tone parameters. The amount of the tone parameters may be changed to change the tone color of the musical tone. In the arrangement, it may be convenient that an operator can edit the parameters as he recognizes how the tone color is changed by the changing of the parameters. For the purpose, electronic musical instruments, in which the musical tone signals can be outputted even in the edit mode by generating the musical tone signals according to the musical tone parameters in editing thereby to allow an operator to confirm the edit tone colors with the sense of hearing, have been in practical use.

It is able to edit the musical tone parameters with the operator's sense so as to be the operator's preference if it is able to confirm the musical tones with the sense of hearing. Further more, it is able to edit the musical tone parameters if it is able to confirm the characteristics, such as spectrums (a frequency distribution), of the musical tones visually or graphically. Particularly, it is very much effective to use such manner in musical tone synthesizing manners which depend on the spectrums, such as a formant synthesizing manner, a harmonics synthesizing manner and a reduction synthesizing manner.

To realize such manner, an FET analyzer for displaying the analyzed spectrums of the inputted musical tones can be used. However, the analyzer consumes much time and memory volume for analyzing and is more expensive. Therefore, it is not preferable to combine the analyzer with any electronic musical instrument.

SUMMARY OF THE INVENTION

It is therefore an object to provide an electronic musical instrument which is capable of displaying graphically characteristics of a musical tone by a simple manner.

In accordance with the present invention, an electronic musical instrument having a musical tone parameter display function comprises musical tone information designation means for designating musical tone information, basic pattern shape generation means for generating a basic pattern shape of a musical tone parameter corresponding to specified musical tone information, pattern shape change means for changing the basic pattern shape according to the musical tone information designated by the musical tone information designation means and pattern shape display means for displaying graphically the changed pattern shape by the pattern shape change means.

With the above arranged electronic musical instrument, when the musical tone information designation means is operated, for example, a musical tone pitch of a specified tone color is designated, the basic pattern shape is changed according to the designated musical tone information and the changed pattern shape is displayed on the display means graphically.

BRIEF DESCRIPTION OF THE DRAWINGS

FIGS. 6A–C are spectrum patterns of formant tones;

DETAILED DESCRIPTION OF THE PREFERRED EMBODIMENTS

An embodiment of the present invention is disclosed referring to drawings as follows.

An electronic musical instrument which is the embodiment of the present invention is a keyboard type electronic musical instrument that is provided with a formant synthesizing function. As described in detail in Japanese patent application, laid-open hei 2-254497, the formant synthesizing function is so arranged that harmonics component waves are outputted during a short time at a cycle of a designated musical tone frequency to thereby generate a formant tone signal (musical tone signal). This electronic musical instrument has a plurality of formant tone wave generating devices connected in parallel, so that a complex and a deep feeling musical tone can be generated by synthesizing the each generated formant tone wave of the individual formant tone wave generating device. Also, this electronic musical instrument is so arranged that the spectrums moving is different for each formant tone according to a tone pitch, so that the tone color of the generated musical tone can be changed depending on the tone pitch as a natural musical instrument.

Figure 7:
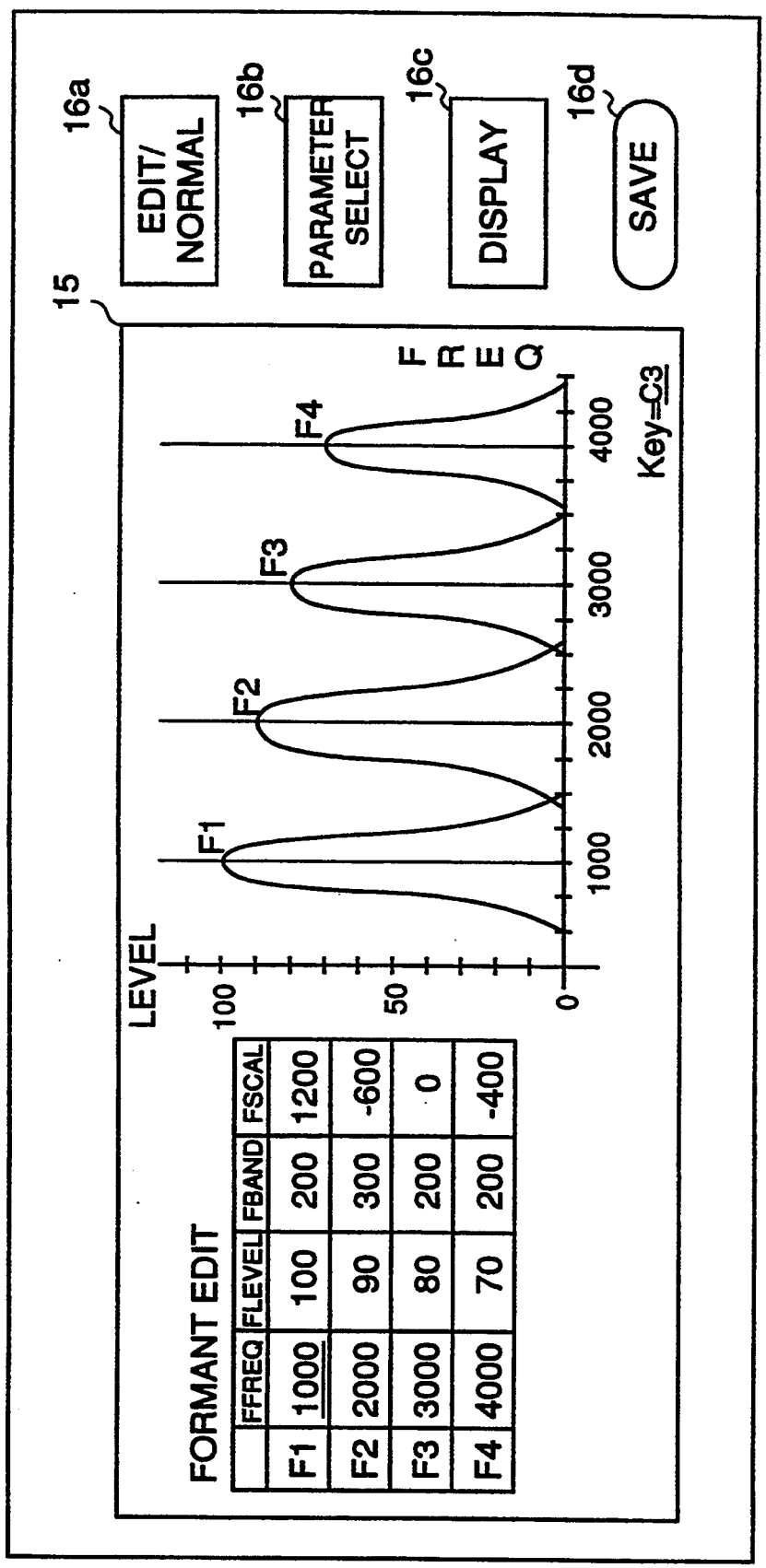
FIG. 7 is a formant pattern display.
Figure 8:
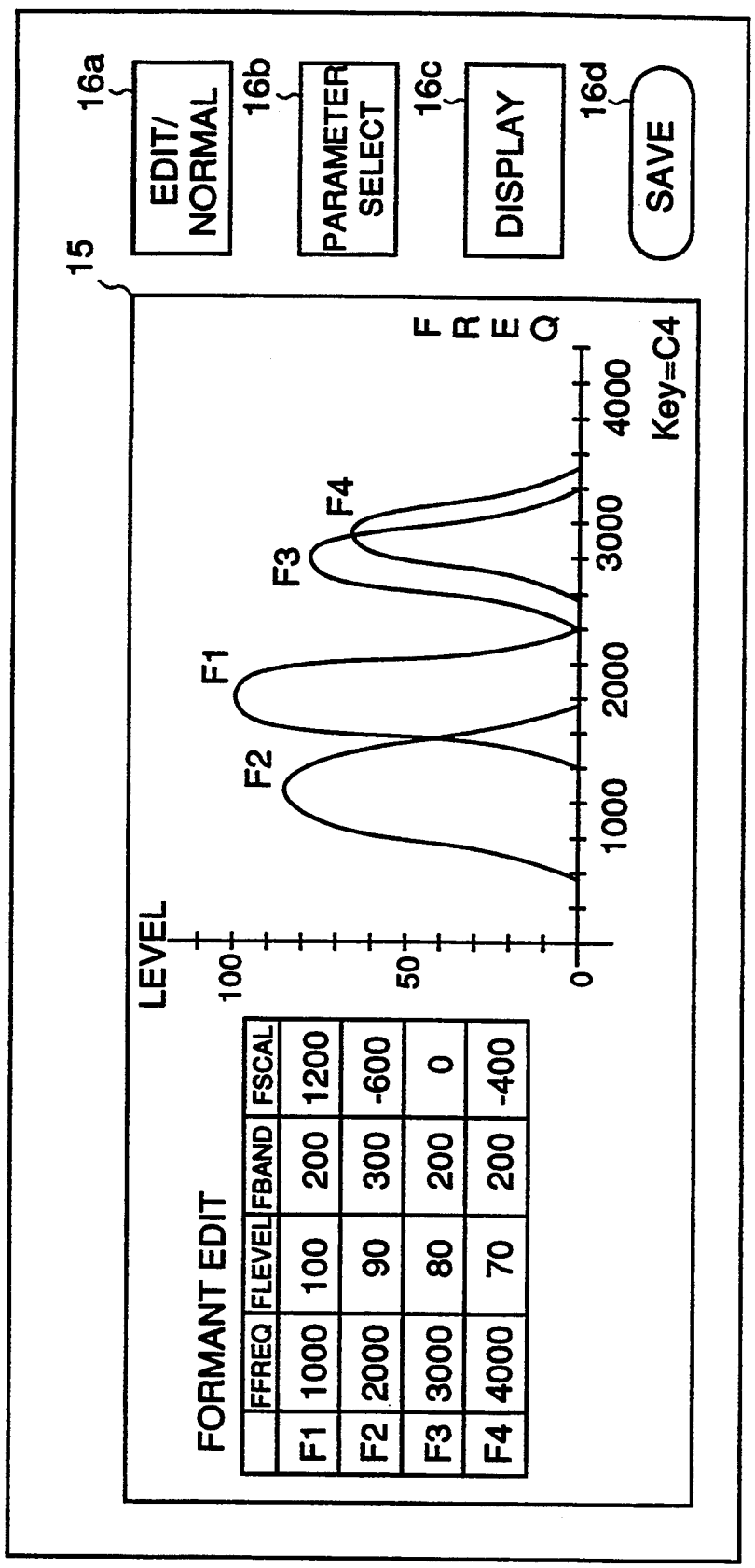
FIG. 8 is a formant pattern display.

A schematic spectrum pattern of each formant tone is shown in FIG. 6. FIG. (A) illustrates the most basic pattern, FIG. (B) illustrates a deformation pattern in which the band width is widened, and FIG. (C) illustrates other deformation pattern in which the level is lowered. The band width is correspond to the center frequency of the formant tone, and the level is correspond to the level of the formant tone. Each formant tone changes individually to the change of the musical tone as shown in FIGS. 7 and 8. In this electronic musical instrument, this change is represented visually and graphically by displaying the pattern shape as shown in the figures.

Figure 1:
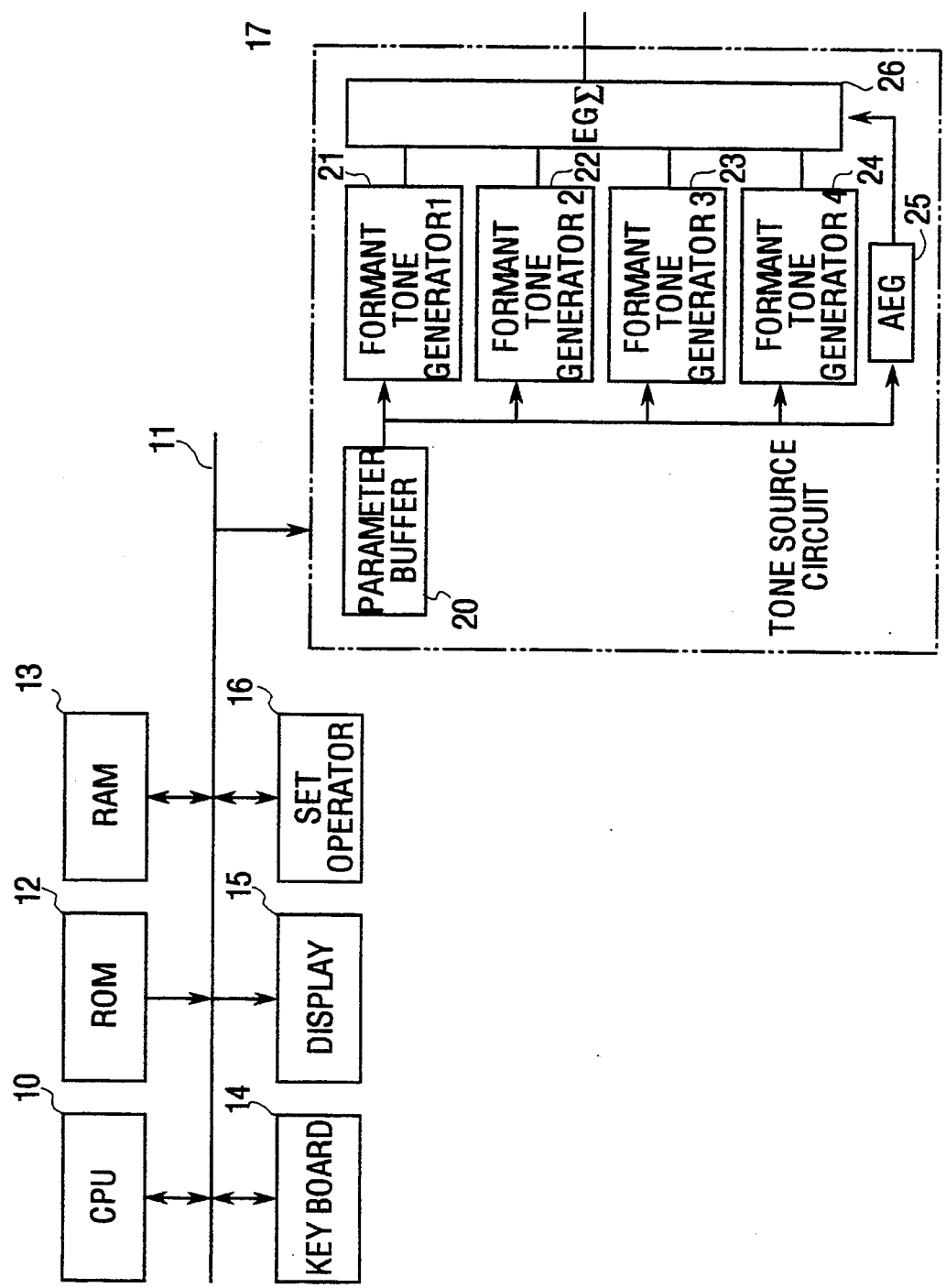
FIG. 1 is a block diagram of an electronic musical instrument according to the invention.
Figure 2:
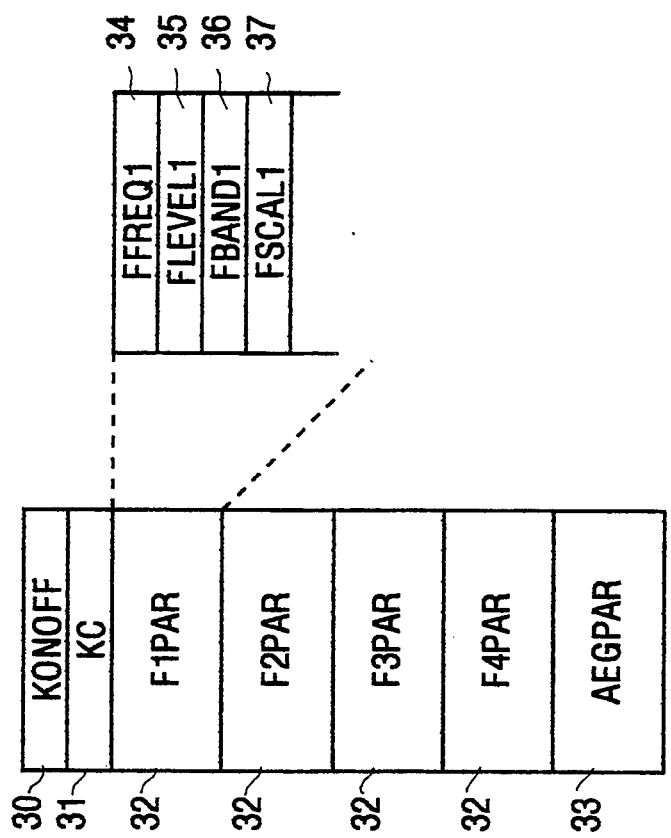
FIG. 2 is a block diagram showing a part configuration of a RAM of the invention.

FIG. 1 is a block diagram of the above mentioned electronic musical instrument. The electronic musical instrument is provided with a CPU 10 as a controller. The CPU 10 is connected through a buss 11 to a ROM 12, a RAM 13, a keyboard 14, a display 15, a setting operator 16 and a tone source circuit 17. The ROM 12 stores a program for controlling the process of the electronic musical instrument tone color data and the like. The RAM 13 stores operated states of the keyboard 14 and the setting operator 16 and musical tone parameters as shown in FIG. 2. The keyboard 14 has sixty-one keys for five octaves. The display 15 is a big liquid crystal matrix display which is shown in FIGS. 7 and 8.

The setting operator 16 includes a mode selecting switch 16a for selecting a normal mode or an edit mode, a parameter selecting switch 16b for selecting a kind of a parameter to be edit, a display mode selecting switch 16c for selecting a display mode, such as a formant display mode, a saving switch 16d, a tone color selecting switch and a parameter change operator.

The tone source circuit 17 is a circuit to synthesize a musical tone signal by synthesizing four formant tones. It is provided with formant tone generators 21 to 24 for each generating a formant tone. The formant tone generators 21 to 24 are connected to a parameter buffer 20 and a synthesizing circuit 26. The parameter buffer 20 is connected to the buss 11, temporarily storing parameters sent from the CPU 10 and outputting the parameters to the formant tone generators 21 to 24 and an amplitude envelope generator 25. The synthesizing circuit 26 synthesizes the formant tone waves generated by the formant tone generators 21 to 24, multiplying the synthesized musical tone signal by an amplitude envelope signal to obtain a time variation of tone volume (i.e., an amplitude envelope). Thus obtained musical tone signal is outputted to a sound system or the like through an external terminal.

FIG. 2 shows a part configuration of the RAM 13. A key-on flag register (KONOFF) 30 stores "1" when any key is turned on and "0" when the key is turned off. The key code register (KC) 31 stores a key code KC specified by a turned-on key. Formant parameter registers (FnPAR) 32 (n=1 to 4) store parameters of formants F1 to F4. An amplitude-envelope-parameter-register (AEGPAR) 33 stores a change ratio of an amplitude change (an attack, a decay, a sustenance, a release or the like) from the beginning of the musical tone generation to the ending thereof and parameter of a target amplitude level.

Each of the registers FnPAR (n=1 to 4) consists of a formant-center-frequency storing area (FFREQ) 34 for storing a center frequency of a formant pattern, a formant-peak-level storing area (FLEVEL) 35 for storing a peak level of a formant pattern, a formant-band-width storing area (FBAND) 36, and a scaling storing area (FSCAL) 37. The parameters stored in these areas are shown in the left side of FIGS. 7 and 8, for example. In the figures, the shown values of the FFREQ, the FLEVEL and the FBAND (representing the band width at the point of −3 dB from the peak) are values as the tone pitch is "C3", and the shown value of the FSCAL is the move amount (the number of cents) of the value of the FFREQ in case that the tone is raised by an octave. For example, in FIGS. 7 and 8, the formant F1 represents that the FFREQ is 1000 Hz, the FLEVEL is 100 (=0 dB), and the FBAND is 200 Hz at the tone pitch "C3". The status of the formant F1 is decided according to the values of such registers. Similarly, the FFREQ is 2000 Hz, the FLEVEL is 90 and the FBAND is 300 Hz regarding the formant F2. Concerning the FSCAL which represents the number of moving cents of the center frequency in case that the tone pitch is raised by an octave (from "C" 3 to "C4"), 1200 cents (one octave) are raised in regard to the formant F1, and 600 cents (a half octave) are downed in regard to the formant F2. In regard to the formant F3, the pitch keeps constant. While in regard to the formant F4, 400 cents are downed. The change ratio of the FSCAL is linearly, so that the change is proportional to the number of octaves or half-tones from the tone pitch "C3". Therefore, when the musical tone of "C4" is generated, there becomes the formant distribution shown in FIG. 8.

Figure 3:
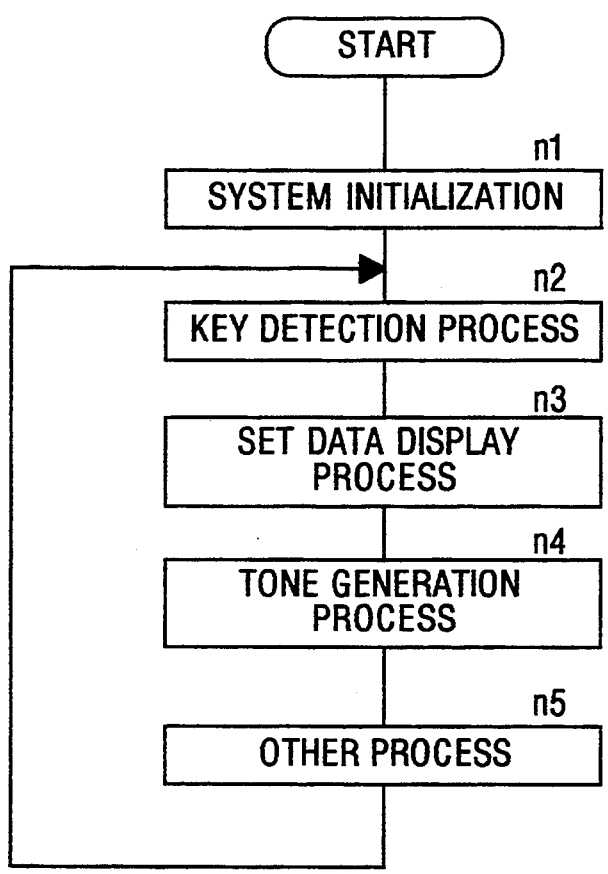
FIGS. 3–5 are flow charts showing processing of the electronic musical instrument of the invention.
Figure 4:
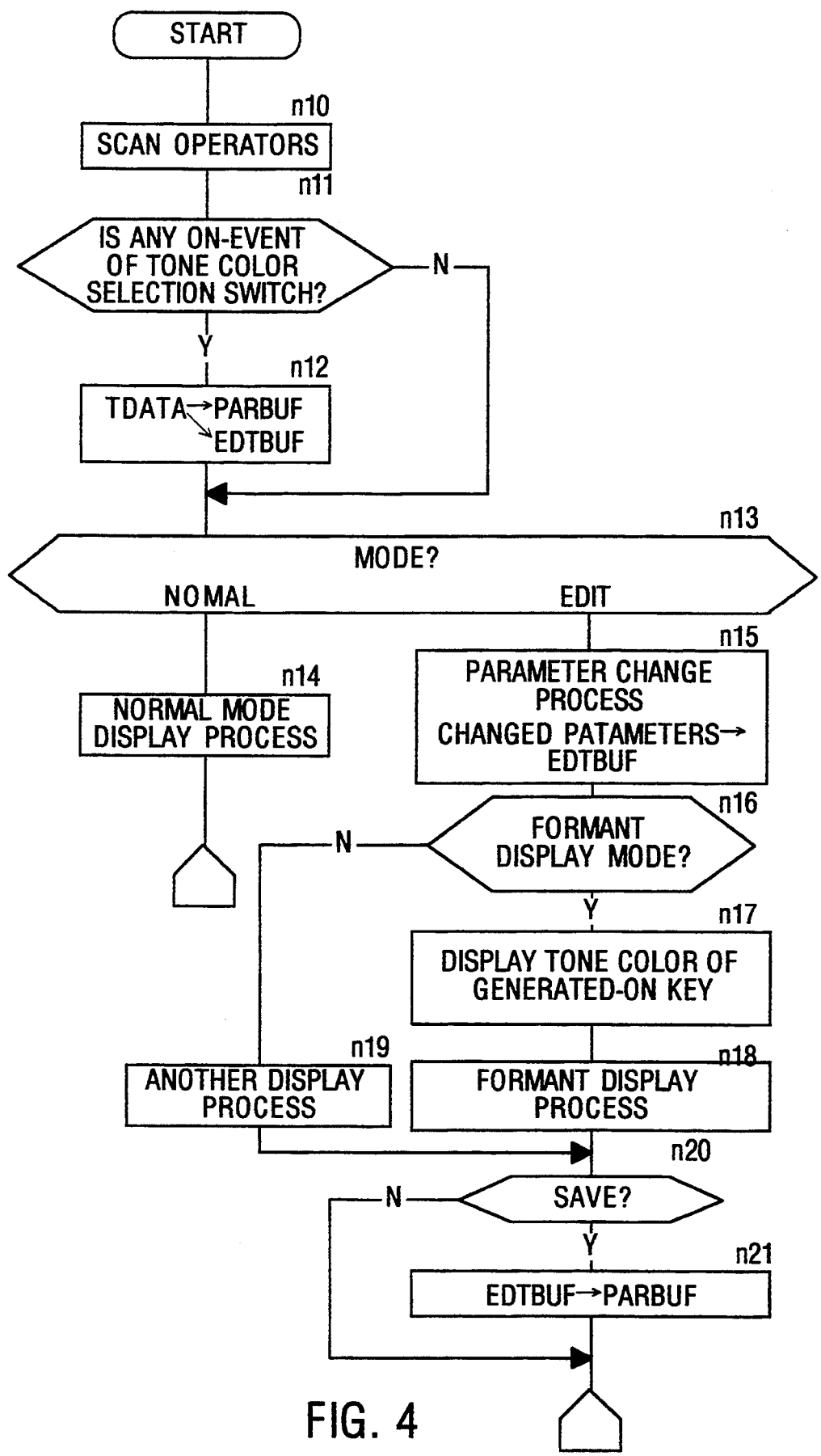
Figure 5:
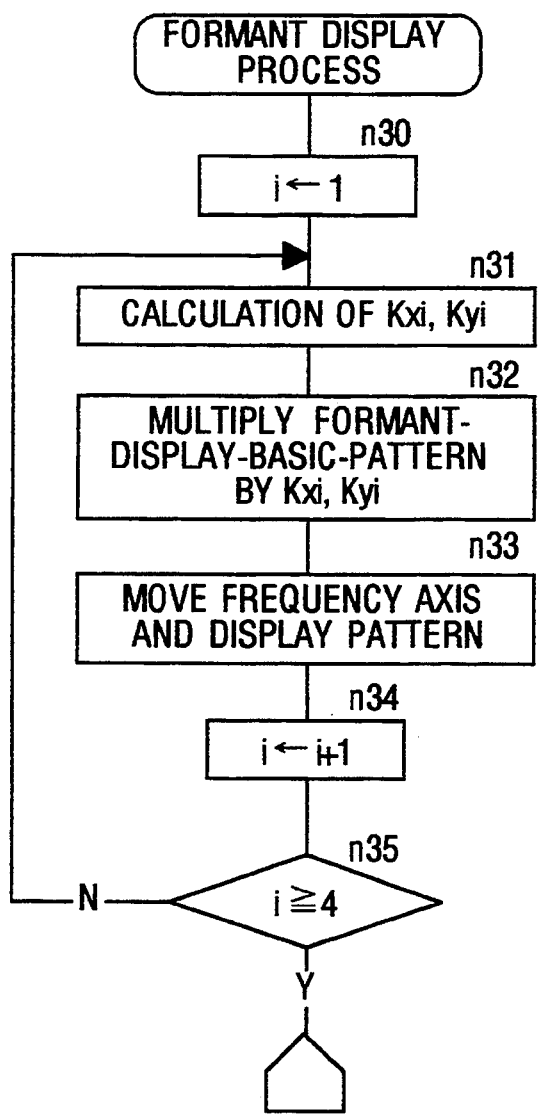

FIGS. 3 to 5 are flow charts showing a process of the above electronic musical instrument. When the power is turned on, a system is initialized to allow a player to play the instrument (n1). The initialization means the reset of registers and the previous set of specified tone colors to the tone source circuit. This initialization enables the instrument to be performed, so that a key detecting process (n2), a set data display process (n3), a tone generation process (n4) and other process (n5) are repeatedly performed. In a normal process, a key-on or a key-off of the keyboard is detected by the key detecting process, and a tone generation or a tone releasing process is performed by the tone source circuit 17 based on the detected key-on or the detected key-off. The other process includes a display control process and a main volume process.

FIG. 4 is a flow chart showing the set data display process. In the process, the operators are scanned (n10), and whether any on-event of the tone color selection switch occurs or not is judged (n11). If any on-event of the switch exists, the selected tone color data TDATA is set into a parameter buffer PARBUF and an edit buffer EDBUF. These buffer registers are allocated in the RAM 13. The tone color data TDATA is in advance stored in the ROM 12 or the RAM 13. After that, the present mode is judged according to the state of the mode selection switch 16a (n13), If the present mode is the normal mode, a normal mode display process is performed and the process returns (n14). That is, the process includes the tone selection process at the normal mode to enable the instrument to generate the selected tone color. While, if no tone color selection event occurs, the process goes to n13 directly.

At n13, if the present mode is the edit mode, the process goes to n15 and following. At the step, the parameter selection switch and the parameter change operator are operated to change the value of the selected parameter. That is, the changed value is written into the corresponding parameter storing area of the EDTBUF. Next, whether the present display mode is the formant display mode or not is judged according to the state of the display mode selection switch 16c (n16). If the mode is the formant display mode, the tone name (tone pitch) corresponding to the key turned on is displayed (n17), and the formant display process (n18) is performed. If the present mode is not the formant display mode, another display process is performed (n19).

After that, whether the saving switch 16d is turned on or not is judged (n20). If the switch 16d is detected to be turned on, the EDTBUF is transferred to the PARBUF and the process returns. Here, the musical tone is generated based on the parameter of the PARBUF in the normal mode, and the EDTBUF in the edit mode.

FIG. 5 is a flow chart showing the formant display process (n18). Referring to the flow chart and FIGS. 6 to 8, the formant pattern display manner is described as follows.

First, "1" is set in a pointer i representing a formant number (n30). Next, a ratio kx of the height of the formant specified by the pointer i and a ratio ky of the width thereof are calculated (n31). Each of the ratios is a rate to the height or the width of the formant display basic pattern (see FIG. 6 (A)), being calculated by the following formulas.

$kx(i) = \text{FBAND}(i)/\text{FBAND}d,$ $ky(i) = \text{FLEVEL}(i)/\text{FLEVEL}d,$ where d representing the basic pattern, and (i) representing the formant tone of the number i.

The formant display basic pattern is multiplied by kx toward the x axis and ky toward the y axis on the basis of the calculated kx and ky so as to be a similar figure as the basic figure (n32). Then the formant pattern is displayed so that the frequency axis of FFREQ*$2^{(FSCAL(KC-64))/1200}$ becomes to the center of the figure (n33). The reason of the calculation is that the FSCAL is stored in the form of the number of cents, while the graph is displayed with the Hz axis. The above process is carried out in respect to i=1 to 4 (n34, n35), and the process returns.

According to the above mentioned process, the schematic frequency spectrums of four formants can be displayed as shown in FIGS. 7 and 8. Here, FIG. 7 represents the formant pattern of the tone pitch "C3" of some tone color, FIG. 8 representing the formant pattern of the tone pitch "C4" of the same tone color. It is apparent to understand immediately the frequency distribution of the tone from the displayed formant pattern, and therefore, it is possible to set and change the parameters quickly.

In the above described embodiment, the target formant pattern is displayed by changing the shape of the basic pattern. It is possible that appropriate pattern is selectable from the plural basic patterns that are previously stored and the selected basic pattern is slightly modified on the display. It is also possible that four basic patterns corresponding to the formants F1 to F4 are previously stored, and the basic patterns are changed for each formant. In the change of the pattern shape, a cut toward the LEVEL direction (y axis direction) can be used in replace of compression to the direction. Also, the basic pattern can be generated by calculating functions, and it is possible that the displayed pattern is controlled according to the generation and change of the outputted musical tones.

What is claimed is:

1. An electronic musical instrument having a musical tone parameter display function, comprising:
   parameter designation means for designating parameters for defining a musical tone to be generated by the electronic musical instrument;
   basic pattern shape generation means for generating a basic pattern shape corresponding to at least one specified parameter for defining a musical tone;
   pattern shape change means for changing the basic pattern shape according to the parameters designated by the parameter designation means; and
   pattern shape display means for displaying the pattern shape changed by the pattern shape change means.

2. An electronic musical instrument having a musical tone parameter display function according to claim 1, wherein said basic pattern generation means includes storage means for storing the basic pattern shape.

3. An electronic musical instrument having a musical tone parameter display function according to claim 1, wherein said pattern shape comprises a pattern shape indicative of a frequency characteristic of a musical tone.

4. An electronic musical instrument having a musical tone parameter display function according to claim 1, wherein said pattern shape change means changes the basic pattern shape according to a frequency characteristic of the musical tone information.

5. An electronic musical instrument having a musical tone parameter display function according to claim 1, wherein said pattern shape change means changes the basic pattern shape according to at least one of the designated parameters indicative of a tone pitch.

6. The electronic musical instrument according to claim 1, wherein said basic pattern shape comprises a rough frequency distribution of the specified parameters of the musical tone to be generated by the electronic musical instrument.

7. An electronic musical instrument having a musical tone parameter display function, comprising:
   parameter designation means for designating parameters of a musical tone to be generated by the electronic musical instrument;
   basic pattern shape generation means for generating a basic pattern shape corresponding to at least one specified parameter of the musical tone to be generated;
   pattern shape change means for changing the basic pattern shape according to the parameters designated by the parameter designation means;
   pattern shape display means for displaying the pattern shape changed by the pattern shape change means;
   a plurality of musical tone wave generation means for generating a corresponding plurality of musical tone waves according to the changed pattern shape; and
   synthesizing means for synthesizing the musical tone waves generated by the musical tone wave generation means.

8. An electronic musical instrument having a musical tone parameter display function according to claim 7, wherein each musical tone wave generation means generates a formant component wave.

9. An electronic musical instrument having a musical tone parameter display function according to claim 7, wherein said basic pattern shape is a formant basic pattern shape.

10. An electronic musical instrument having a musical tone parameter display function according to claim 7, further comprising amplitude envelope generating means for generating an amplitude envelope signal, wherein said synthesizing means includes multiplying means for multiplying the synthesized musical tone wave by the amplitude envelope signal.

* * * * *